July 11, 1950  F. H. WOLFE, JR  2,514,822
HELICOPTER AUTOMOBILE

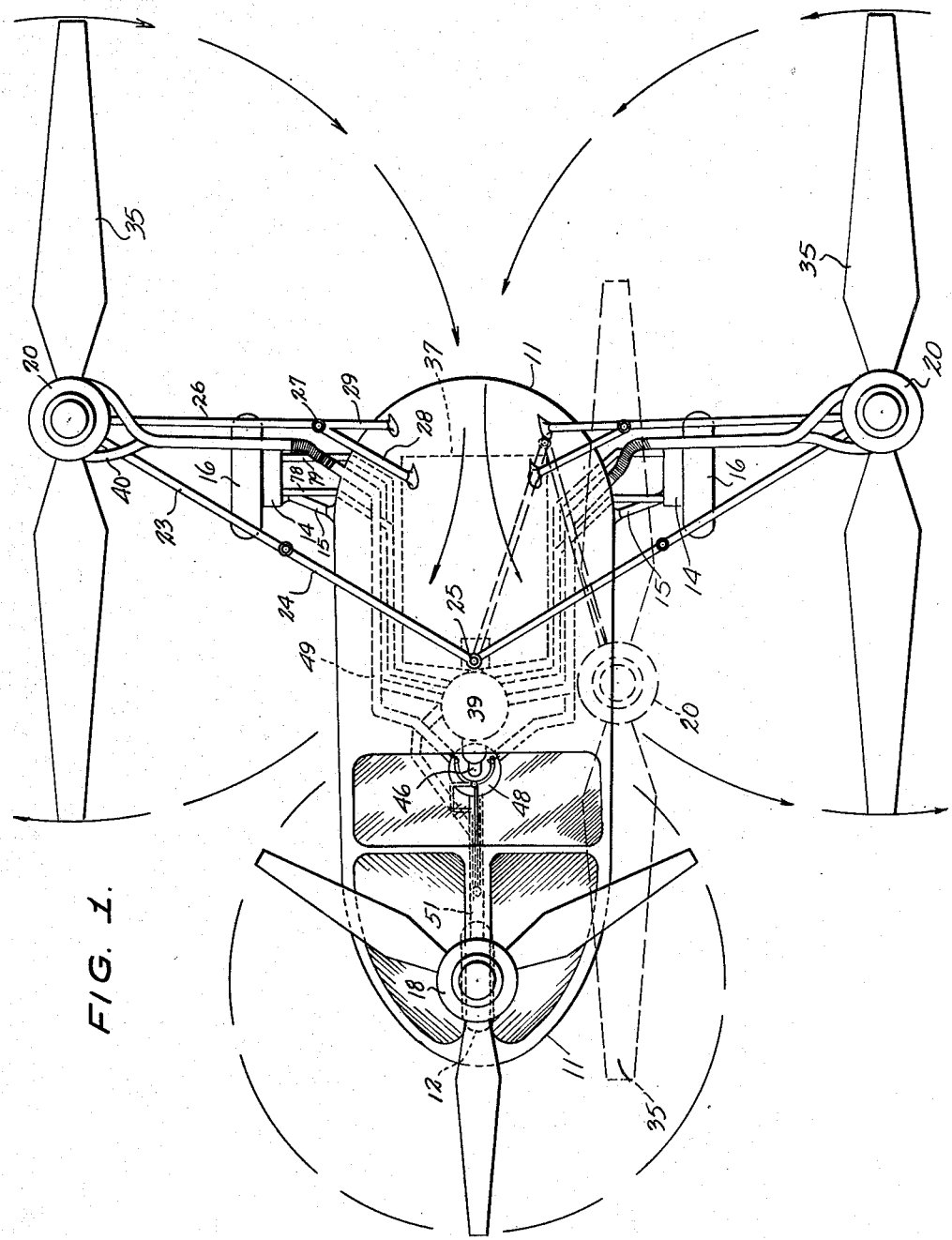

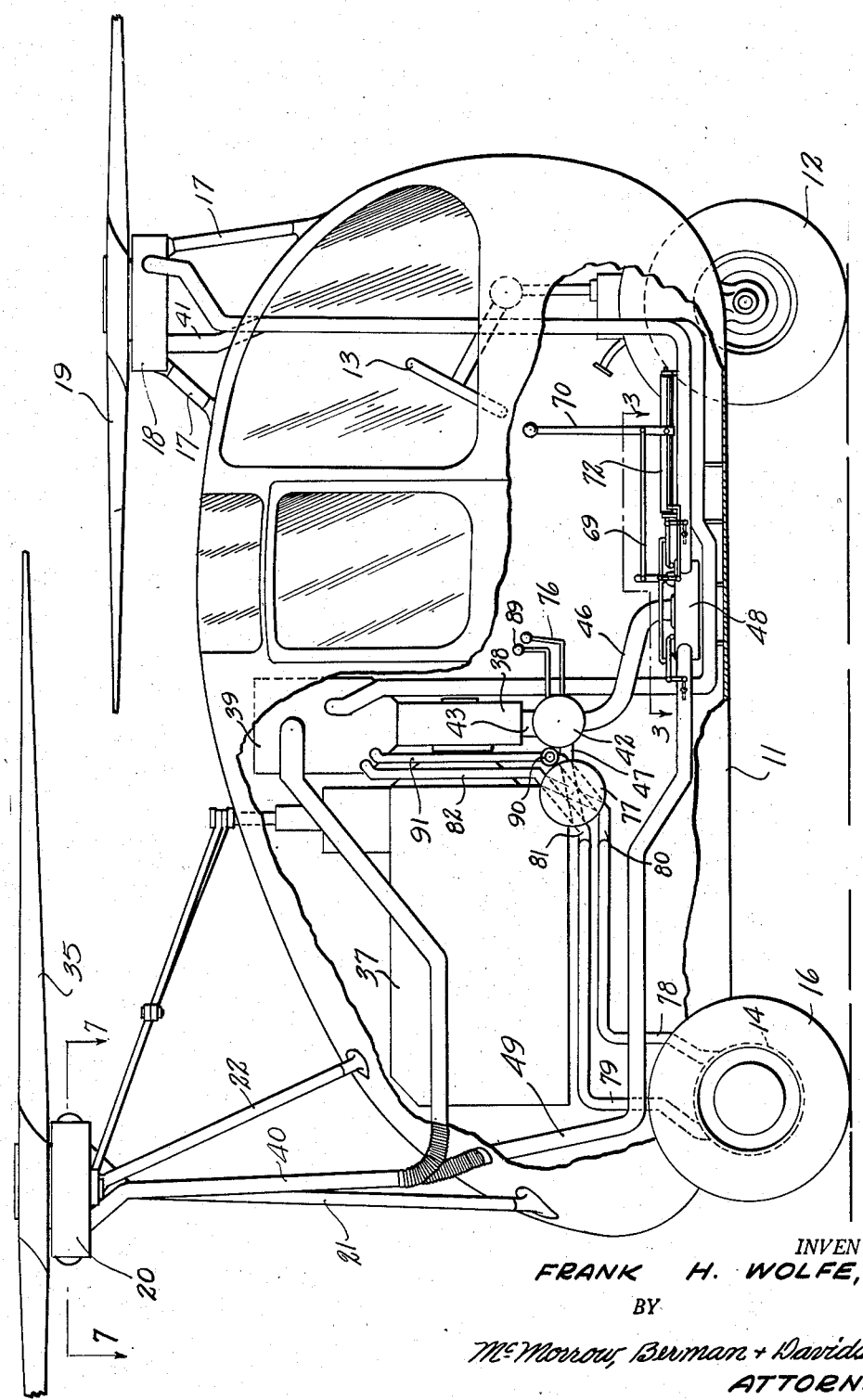

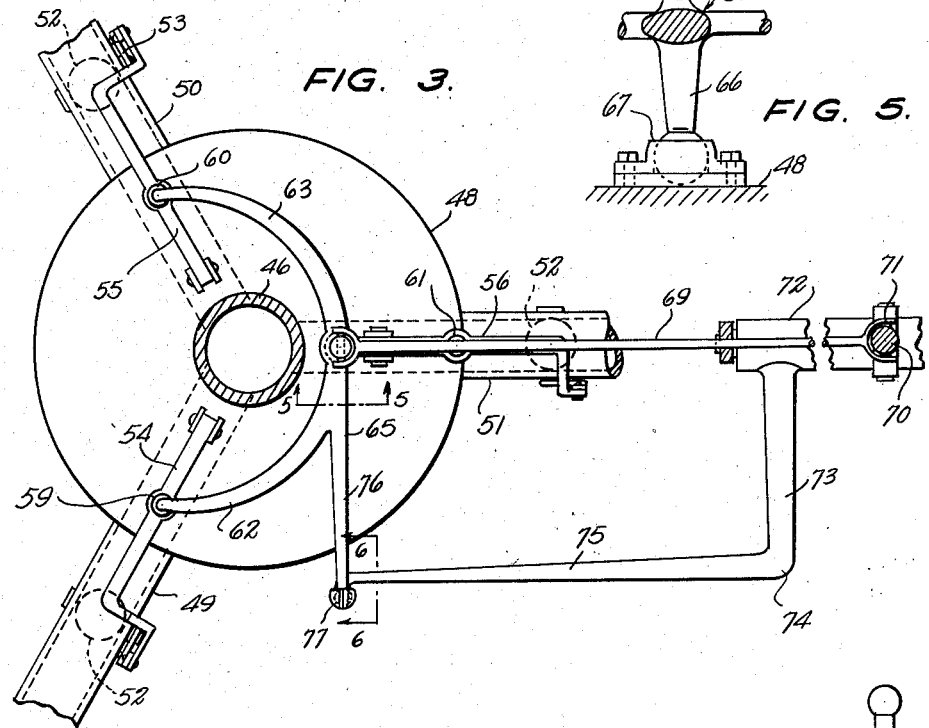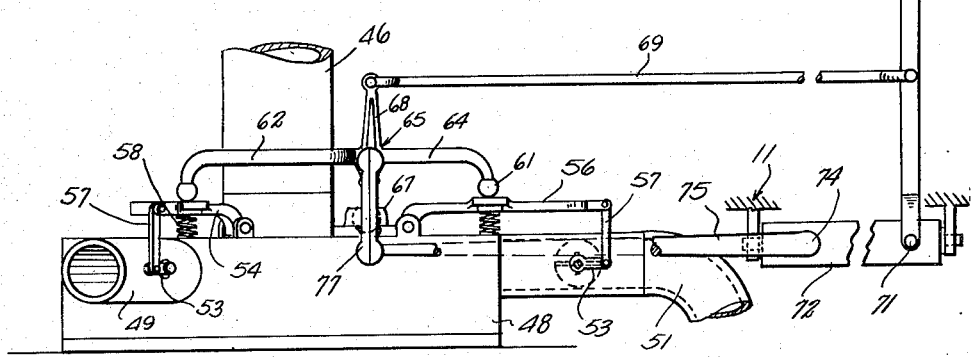

Filed Aug. 19, 1949  4 Sheets-Sheet 4

INVENTOR.
FRANK H. WOLFE, JR.
BY
McMorrow, Berman + Davidson
ATTORNEYS.

Patented July 11, 1950

2,514,822

UNITED STATES PATENT OFFICE 2,514,822

HELICOPTER AUTOMOBILE

Frank H. Wolfe, Jr., Houston, Tex.

Application August 19, 1949, Serial No. 111,212

5 Claims. (Cl. 244—2)

This invention relates to helicopters, and more particularly to a combined helicopter and road vehicle.

A main object of the invention is to provide a novel and improved combination helicopter and road vehicle which is very simple in construction, easy to operate, and which employs the same motor for driving the vehicle either as a helicopter or as a road machine.

A further object of the invention is to provide an improved vehicle combining the flying characteristics of a helicopter and the road characteristics of an ordinary automobile, the machine being powered by a single motor, involving only a few controls, being compact in size, being relatively light in weight, and being rugged in construction.

Further objects and advantages of the invention will become apparent from the following description and claims, and from the accompanying drawings, wherein:

Figure 1 is a top plan view of a combination helicopter and road vehicle constructed in accordance with the present invention;

Figure 2 is a side elevational view, partly broken away, of the vehicle shown in Figure 1;

Figure 3 is an enlarged cross-sectional detail view taken on line 3—3 of Figure 2;

Figure 4 is a side elevational view of the structure illustrated in Figure 3;

Figure 5 is an enlarged cross-sectional detail view taken on line 5—5 of Figure 3;

Figure 6 is an enlarged cross-sectional detail view taken on line 6—6 of Figure 3;

Figure 7:
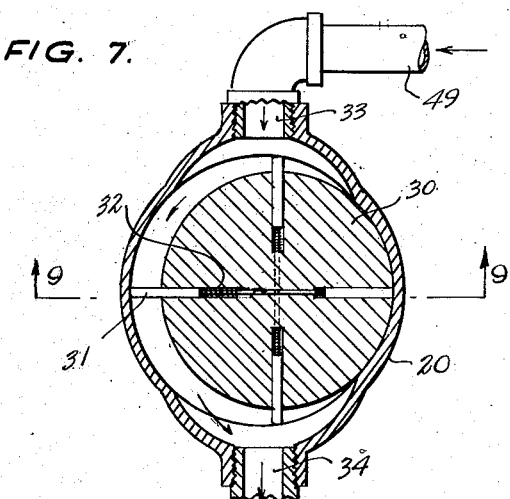
Figure 7 is an enlarged cross-sectional detail view taken on line 7—7 of Figure 2.

Referring to the drawings, the body of the vehicle is designated generally at 11. Designated at 12 is a steerable front road wheel, journaled to the front end portion of body 11 in a conventional manner and provided with suitable steering means including a steering wheel 13. Designated at 14, 14 are respective hydraulic motors secured by means of struts 15 to the respective rear side portions of body 11. Secured to the rotor shaft of each hydraulic motor 14 is a rear road wheel 16.

Secured by means of struts 17 to the top of the vehicle body 11 at its forward end is a hydraulic motor 18 having a vertical shaft to which is secured a horizontal three-bladed propeller 19. Designated at 20, 20 are additional hydraulic motors at the rear of the body 11 and spaced laterally on opposite sides thereof. Each motor 20 is detachably secured to the top ends of struts 21, 22 which are secured to the body 11, and is also secured to the top of body 11 by hinged links 23 and 24 connecting the motor to the body at 25 and by a link 26 pivotally connected at 27 to the junction of struts 28 and 29 secured rigidly to the body. From Figures 1 and 2 it will be seen that when motors 20 are detached from struts 21 and 22, the motors 20 may be folded from the outwardly-spaced positions shown in Figure 1 to positions adjacent the sides of body 11. Each hydraulic motor has rotatably mounted therein an eccentrically-located cylindrical rotor 30 provided with a plurality of outwardly-slidable, radial vanes 31 biased outwardly from rotor 30 by radial springs 32. Each motor has a fluid inlet passage 33 and a diametrically-opposed outlet passage 34, as shown in Figure 7. When fluid enters the motor at passage 33, the rotor 30 is rotated counterclockwise, as viewed in Figure 7, the fluid discharging through passage 34. By reversing the direction of the fluid, the motor direction of rotation may be reversed.

The rotor shaft 36 of each motor 20 has a horizontal two-bladed propeller 35 secured thereto.

Mounted in the rear portion of the vehicle body 11 is an engine 37 which drives a hydraulic pump 38. Designated at 39 is a fluid reservoir mounted on the pump 38 and communicating with the intake side of the pump. Designated at 40 and 41 are return conduits connecting the discharge passages of motors 20 and 18 to the reservoir 39. The outlet passage of pump 38 is connected to a main control valve 42 by a conduit 43.

Figure 10:
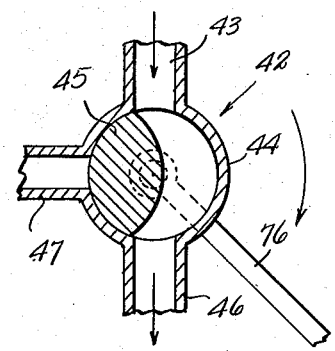
Figure 10 is a vertical cross-sectional view taken through the main rotary control valve regulating distribution of hydraulic fluid in the machine of Figure 1, the rotor of the valve being shown in flying position.
Figure 8:
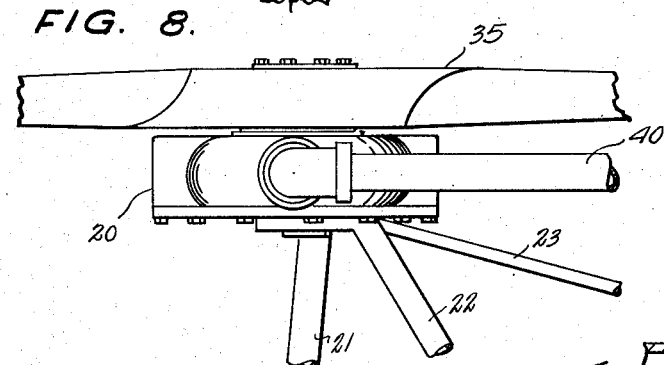
Figure 8 is a side elevational view of the structure shown in Figure 7.
Figure 11:
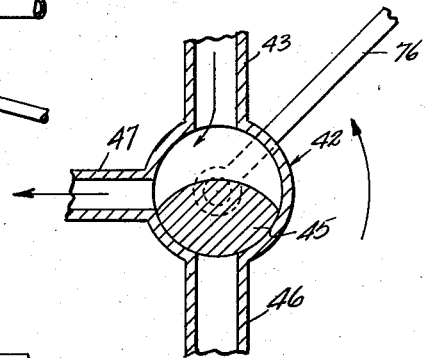
Figure 11 is a view similar to Figure 10, but showing the valve rotor in ground-operating position.
Figure 9:
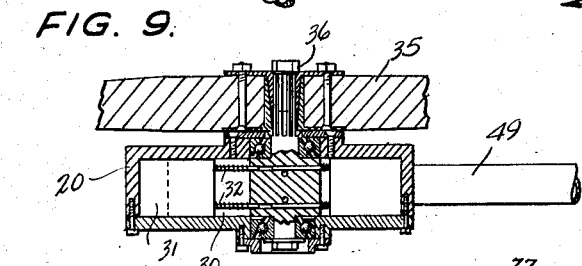
Figure 9 is a cross-sectional detail view taken on line 9—9 of Figure 7.

As shown in Figures 10 and 11, main control valve 42 comprises a cylindrical body 44 in which is rotatably mounted a valve member 45 having the cross-sectional shape shown in said figures. Body 44 is formed diametrically opposite conduit 43 with a first outlet conduit 46 and is formed midway between conduits 43 and 46 with a second outlet conduit 47. Conduit 46 is connected to the top of a horizontal cylindrical chamber 48. Extending radially from chamber 48 are the respective outlet conduits 49, 50 and 51, as shown in Figures 3 and 4. Conduits 49 and 50 are connected to the intake passages 33 of the respective rear propeller motors 20. Conduit 51 is connected to the intake passage of the forward propeller motor 18. Pivoted in each of the conduits 49, 50 and 51 is a disc valve 52, each disc valve having externally secured to its shaft an arm 53. Pivoted to the top wall of chamber 48 are the respective radial arms 54, 55 and 56. The ends of the respective arms 54, 55 and 56 are connected by respective links 57 to the arms 53 of the respective disc valves. Each arm 54, 55 and 56 is biased upwardly by a coiled spring 58 bearing beneath the intermediate portion of the arm and secured to the top wall of chamber 48, thereby biasing the disc valves 52 toward horizontal open positions.

Designated at 59, 60 and 61 are respective ball-tipped, depending extensions carried by the respective fingers 62, 63 and 64 of a steering member 65. These extensions engage the intermediate portions of the respective arms 54, 55 and 56. Member 65 has a depending leg 66, shown in Figure 5, pivotally secured for universal rotation to the top wall of chamber 48 by means of a ball-and-socket joint 67. Member 65 also has an upstanding arm 68 connected by a longitudinal link bar 69 to a control stick 70. The lower end of stick 70 straddles and is pivotally secured at 71 to a longitudinal shaft member 72 rotatably mounted for axial rotation in the frame portion of body 11. Shaft member 72 is formed with a radial arm 73 having a right-angled bend 74 defining a longitudinally-extending arm portion 75. Member 65 is formed with a laterally-projecting arm 76 connected by a link 77 to the end of arm portion 75. Due to the parallel linkages above defined, the member 65 will follow the movement of stick 70. When the stick is rotated counterclockwise, as viewed in Figure 4, arms 54 and 55 are depressed, causing the valves 52 in conduits 49 and 50 to be moved toward closing positions. This cuts off fluid flow to the rear motors 20. Clockwise movement of stick 70 depresses arm 56, cutting off fluid flow to forward motor 18. Lateral rotation of stick 70 cuts off fluid flow to one or the other of the rear motors 20. It is, therefore, apparent that movement of stick 70 controls the flow of fluid to the respective propeller motors 20 and 18, providing a means of steering the machine while it is elevated in the air and providing a means of directing it forwardly or rearwardly.

Referring now to Figures 10 and 11, it will be seen that the valve member 45 may be positioned as in Figure 10, wherein fluid may flow from conduit 43 to conduit 46, conduit 47 being closed off, whereby fluid is admitted to the propeller motors 20 and 18, or may be positioned as in Figure 11, wherein conduit 46 is closed off and fluid is admitted to conduit 47. A control rod 76 is secured to the shaft of valve member 45 for varying its rotated position.

Figure 12:
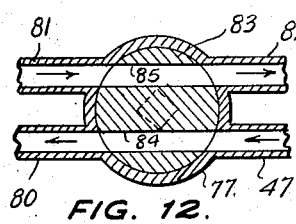
Figure 12 is a cross-sectional view taken through the ground-direction-control valve employed in the machine of Figure 1, said view being taken on line 12—12 of Figure 14.
Figure 14:
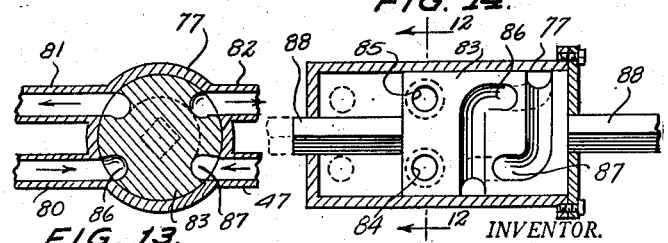
Figure 14 is a longitudinal vertical cross-sectional view taken through the ground-direction-control valve employed in the machine of Figure 1.
Figure 13:
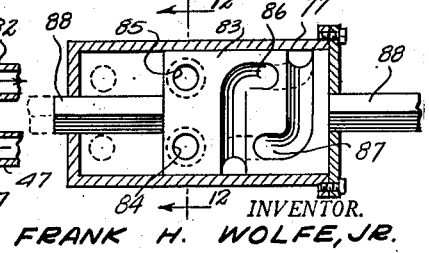
Figure 13 is a view similar to Figure 12, but showing the direction-control valve set in reverse position.

The conduit 47 is connected, as shown in Figures 12 to 14, to a cylindrical reversing valve 77. Each of the rear wheel hydraulic motors 14 has connected thereto respective conduits 78 and 79. The conduits 78 are connected to a conduit 80 which is connected to valve 77 opposite conduit 47. The conduits 79 are connected to a conduit 81 which is connected to valve 77 above conduit 80 and opposite a conduit 82 which connects valve 77 to the reservoir 39. Slidably positioned in valve 77 is a plug member 83 formed with a first set of passages 84 and 85, adapted to directly connect the respective pairs of conduits 47, 80 and 82, 81 in the position of the plug member shown in Figure 12. In this position, fluid passes from valve 42 through conduit 47, passage 84 and conduits 80, 78 to the hydraulic motors 14, producing forward drive, the fluid exhausting from the motors through conduits 79, 81, passage 85 and conduit 82 to reservoir 39. Plug member 83 is formed with additional grooved passages 86 and 87 adapted to connect conduit 47 to conduit 81 and conduit 80 to conduit 82 when the plug member is moved longitudinally to the left from the position of Figure 14 into the position of Figure 13, reversing the fluid pressure drive on the wheel motors 14. The plug member 83 is provided with square axial shaft 88 extending slidably but non-rotatively, through the end walls of the valve 77. The plug member may be manually shifted by means of a control lever 89 suitably connected to one of the shaft elements 88.

It will be apparent that when control lever 76 is in the position shown in Figure 11, the propeller motors 20 and 18 will be in an inoperative condition and the wheel motors 14 will be driven by the hydraulic fluid. The direction of drive of the wheel motors may be controlled by reversing lever 89.

Conduit 47 is connected through a pressure-responsive relief valve 90 to a by-pass return conduit 91 connected to reservoir 39. By moving plug member 83 to a half-way position wherein conduits 82 and 47 are closed off, the fluid pressure drive to the wheel motors 14 may be cut off and the fluid from conduit 47 by-passed through the relief valve 90 and conduit 91 to the reservoir 39. This allows the engine 37 to idle when the vehicle is in a stationary position on the ground.

When the vehicle is operating as a helicopter, the propeller motors 20 are in extended positions, as shown in Figures 1 and 2, and valve lever 76 is in the position of Figure 10. The direction of movement of the vehicle may be controlled by means of the control stick 70, as above explained.

When the vehicle is to be driven on the ground, the propeller motors are de-energized by placing valve lever 76 in the position of Figure 11. The propeller motors 20 are folded adjacent the body 11 by detaching said motors from the struts 21, 22 and folding the links 26, 24, 23 inwardly toward said body. When operated as a ground vehicle, the machine may be steered by means of steering wheel 13. The direction of drive may be controlled by lever 89, which also is employed to discontinue drive to the wheel motors, as above described, when it is desired to stop the vehicle. The road wheels may be provided with conventional brakes, allowing the vehicle to be controlled in the same manner as a conventional automobile.

While a specific embodiment of a combination helicopter and road vehicle has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A combination helicopter and road vehicle comprising a body, a plurality of road wheels journaled to said body, a plurality of lifting propellers rotatably secured to the top of said body, respective fluid motors coupled to the wheels and the propellers, a fluid pump carried by the body, conduit means connecting said pump to the respective fluid motors, and a selector valve interposed in said conduit means and formed and arranged for selectively connecting the pump either to the road wheel motors or to the propeller motors.

2. A combination helicopter and road vehicle comprising a body, a plurality of road wheels journaled to said body, a plurality of lifting propellers rotatably secured to the top of said body, respective fluid motors coupled to the wheels and to the propellers, a fluid pump carried by the body, conduit means connecting said pump to the respective fluid motors, a selector valve interposed in said conduit means and formed and arranged for selectively connecting the pump either to the road wheel motors or to the propeller motors, and additional valve means interposed in said conduit means between the selector valve and the propeller motors and formed and arranged to selectively control the rate of flow of fluid to the respective propeller motors.

3. A combination helicopter and road vehicle comprising a body, a plurality of road wheels journaled to said body, a plurality of lifting propellers rotatably secured to the top of said body, respective fluid motors coupled to the wheels and propellers, a fluid pump carried by the body, conduit means connecting said pump to the respective fluid motors, a selector valve interposed in said conduit means and formed and arranged for selectively connecting the pump either to the road wheel motors or to the propeller motors, and additional valve means interposed in said conduit means between the selector valve and the road wheel motors and formed and arranged to control the direction of flow of fluid with respect to the road wheel motors.

4. A combination helicopter and road vehicle comprising a body, a plurality of road wheels journaled to said body, a plurality of lifting propellers rotatably secured to the top of said body, respective fluid motors coupled to the wheels and to the propellers, a fluid pump carried by the body, conduit means connecting said pump to the respective fluid motors, a selector valve interposed in said conduit means and formed and arranged for selectively connecting the pump either to the road wheel motors or to the propeller motors, additional valve means interposed in said conduit means between the selector valve and the propeller motors and formed and arranged to selectively control the rate of flow of fluid to the respective propeller motors, and further valve means interposed in said conduit means between the selector valve and the road wheel motors and formed and arranged to control the direction of flow of fluid with respect to the road wheel motors.

5. A combination helicopter and road vehicle comprising a body, a plurality of road wheels journaled to said body, a plurality of lifting propellers rotatably secured to the top of said body, respective fluid motors coupled to the wheels and propellers, a fluid pump carried by said body, conduit means connecting said pump to the respective fluid motors, a selector valve interposed in said conduit means and formed and arranged for selectively connecting the pump either to the road wheel motors or to the propeller motors, and additional valve means interposed in said conduit means between the selector valve and the propeller motors and formed and arranged to selectively control the rate of flow of fluid to the respective propeller motors, said additional valve means comprising a chamber, a rocker member universally pivoted to the top wall of said chamber, respective pivoted valves in the conduit means located between the chamber and the respective propeller motors, respective arms carried by the rocker member, extending adjacent the pivoted valves, actuating linkages connected to the respective pivoted valves and engaged by the respective arms, and spring means biasing the pivoted valves toward open positions.

FRANK H. WOLFE, Jr.

REFERENCES CITED

The following references are of record in the file of this patent:

UNITED STATES PATENTS

| Number | Name | Date |
|---|---|---|
| 1,827,438 | Rauch | Oct. 13, 1931 |
| 2,371,687 | Gerhardt | Mar. 20, 1945 |

FOREIGN PATENTS

| Number | Country | Date |
|---|---|---|
| 58,961 | Austria | May 10, 1913 |